(12) United States Patent
Jin et al.

(10) Patent No.: US 8,344,043 B2
(45) Date of Patent: Jan. 1, 2013

(54) THERMOPLASTIC RESIN COMPOSITION HAVING GOOD SCRATCH RESISTANCE AND MOLDED ARTICLE MADE THEREFROM

(75) Inventors: Sung Hun Jin, Uiwang-si (KR); Chang Min Hong, Uiwang-si (KR); Dong Hui Chu, Uiwang-si (KR); Tae Woog Jang, Uiwang-si (KR); In Chol Kim, Uiwang-si (KR); Yu Ho Kim, Uiwang-si (KR); Don Keun Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/971,348

(22) Filed: Dec. 17, 2010

(65) Prior Publication Data

US 2011/0152402 A1 Jun. 23, 2011

(30) Foreign Application Priority Data

Dec. 23, 2009 (KR) .......................... 10-2009-0129622
Nov. 10, 2010 (KR) .......................... 10-2010-0111405

(51) Int. Cl.
*C08K 3/00* (2006.01)
*C08L 51/04* (2006.01)
*C08F 290/04* (2006.01)

(52) U.S. Cl. ............ 523/122; 524/504; 525/75; 525/76; 525/77; 525/78

(58) Field of Classification Search ................... 523/122; 524/504; 525/75, 76, 77, 78
See application file for complete search history.

(56) References Cited

U.S. PATENT DOCUMENTS

2009/0298970 A1* 12/2009 Attarwala et al. ............ 523/201

FOREIGN PATENT DOCUMENTS

KR 2003-56087 A 7/2003

* cited by examiner

*Primary Examiner* — Kriellion Sanders
(74) *Attorney, Agent, or Firm* — Summa, Additon & Ashe, P.A.

(57) ABSTRACT

The present invention provides a thermoplastic resin composition that can have improved scratch resistance comprising: (A) about 10 to about 20% by weight of a rubber modified aromatic vinyl graft copolymer resin; (B) about 30 to about 50% by weight of polymethylmethacrylate (PMMA) resin; and (C) about 40 to about 60% by weight of an aromatic vinyl copolymer resin including about 5 to about 50% by weight of a (meth)acrylate alkyl ester. The thermoplastic resin composition of the present invention can have a good balance of various properties such as scratch resistance, impact strength, colorability, gloss, and injection molding properties.

9 Claims, No Drawings

THERMOPLASTIC RESIN COMPOSITION HAVING GOOD SCRATCH RESISTANCE AND MOLDED ARTICLE MADE THEREFROM

CROSS-REFERENCE TO RELATED APPLICATION

This application claims priority from Korean Patent Application Nos. 2009-129622 and 2010-111405, entitled "Thermoplastic Resin Composition Having Good Scratch Resistance and Molded Article Made Therefrom," which were filed on Dec. 23, 2009 and Nov. 10, 2010, respectively, the latter claiming priority based on the former, and are hereby incorporated by reference in their entirety.

FIELD OF THE INVENTION

The present invention relates to a scratch resistant resin composition and a molded article prepared therefrom.

BACKGROUND OF THE INVENTION

Acrylonitrile-butadiene-styrene graft copolymer resin (hereinafter, ABS resin) generally has good impact resistance, processability, mechanical strength, heat distortion temperature and gloss. Therefore, the resin has been widely used in the manufacture of electric or electronic goods, office automation (OA) instruments, and the like. However, ABS resins used in the manufacture of electronic product housings for LCDs, PDP TVs, audio equipment, and the like, tend to show scratches as a result of injection molding or during normal usage. Further, it can be difficult to impart a desired color to the ABS resin, which can decrease its commercial value.

To avoid this problem, the surface of the molded ABS resin article can be coated with urethane or UV curable acrylic resin. However, these coating methods require post-processing treatment. This can complicate the manufacturing process and result in a high defect rate, which in turn can decrease productivity. Further, these coating methods can give rise to a problem of environmental contamination. Therefore there remains a need for a scratch resistant resin having improved gloss and impact resistance and which can be readily processed using injection molding processes.

Acrylic resin, PMMA resin, and the like are examples of scratch resistant materials which do not require a urethane coating and which have good colorability and gloss. However, PMMA resin has poor impact resistance and insufficient moldability, which can make injection molding difficult. Therefore, this material is generally extruded as a sheet and the extruded sheet is attached to a molded article. However, this method can be expensive and have a high defect rate due to post-processing steps.

Besides PMMA resin, methyl methacrylate-acrylonitrile-butadiene-styrene resin (g-MABS or so-called "transparent ABS resin") can be used as a scratch resistant material. Although the transparent ABS resin has good colorability, gloss, and impact resistance, it does not have sufficient scratch properties such as R-hardness and flexural modulus. Accordingly, the material can warp or bend during molding processes.

Further, ABS/PMMA alloy has poor colorability and does not exhibit sufficient scratch resistance, although it has good impact resistance.

SUMMARY OF THE INVENTION

The present invention provides a thermoplastic resin composition that can have improved scratch resistance. The composition of the invention can further exhibit a balance of properties, such as scratch resistance, impact strength, colorability, gloss, and injection moldability. The thermoplastic resin composition of the invention includes: (A) about 10 to about 20% by weight of a rubber modified aromatic vinyl graft copolymer resin; (B) about 30 to about 50% by weight of polymethylmethacrylate (PMMA) resin; and (C) about 40 to about 60% by weight of an aromatic vinyl copolymer resin including about 5 to about 50% by weight of (meth)acrylate alkyl ester.

The rubber modified aromatic vinyl graft copolymer resin (A) may comprise about 10 to about 60% by weight of a rubbery polymer, about 20 to about 80% by weight of an aromatic vinyl monomer, and about 5 to about 45% by weight of a monomer copolymerizable with the aromatic vinyl monomer.

The aromatic vinyl copolymer resin (C) including about 5 to about 50% by weight of the (meth)acrylate alkyl ester may comprise methacrylate acrylonitrile styrene (M-SAN) resin.

The thermoplastic resin composition of the present invention may further include one or more additives such as but not limited to antioxidants, lubricant, impact modifiers, plasticizers, stabilizers, light stabilizers, pigments, dyes, inorganic fillers, antibacterial agent, antistatic agents, and the like, and combinations thereof.

The present invention provides also a molded article prepared from the thermoplastic resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Rubber Modified Aromatic Vinyl Graft Copolymer Resin

The rubber modified aromatic vinyl graft copolymer resin (A) according to the present invention has a core-shell structure. The rubber modified aromatic vinyl graft copolymer resin (A) may be prepared by adding an aromatic vinyl monomer, a monomer copolymerizable with the aromatic vinyl monomer, and optionally a monomer providing processability and heat resistance to a rubbery polymer and polymerizing them together.

The rubber modified aromatic vinyl graft copolymer resin (A) can include about 10 to about 60% by weight of a rubbery polymer, about 20 to about 80% by weight of an aromatic vinyl monomer, and about 5 to about 45% by weight of a monomer copolymerizable with the aromatic vinyl monomer.

In some embodiments, the rubbery polymer may be used in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight. Further, according to some embodiments of the present invention, the amount of the rubber polymer can be in a range from about any of the foregoing amounts to about any other of the foregoing amounts.

In some embodiments, the aromatic vinyl monomer may be used in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the aromatic vinyl monomer can be in a range from about any of the foregoing amounts to about any other of the foregoing amounts.

In some embodiments, the monomer copolymerizable with the aromatic vinyl monomer may be used in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45% by weight. Further, according to some embodiments of the present invention, the amount of the monomer copolymerizable with the aromatic vinyl monomer can be in a range from about any of the foregoing amounts to about any other of the foregoing amounts.

The monomer imparting processability and heat resistance may be used in an amount of about 0 to about 15% by weight, based on the total weight of the graft copolymer resin (A). In some embodiments, the graft copolymer resin may not include the monomer imparting processability and heat resistance (i.e., the graft copolymer resin may include 0% by weight of the monomer imparting processability and heat resistance). In some embodiments, the monomer imparting processability and heat resistance may be present in the graft copolymer resin, i.e., the graft copolymer resin may include the monomer imparting processability and heat resistance in an amount of greater than and/or about 0, 1, 2, 3, 4, 5, 6, 7, 8, 9, 10, 11, 12, 13, 14, or 15% by weight. Further, according to some embodiments of the present invention, the amount of the monomer imparting processability and heat resistance can be in a range from about any of the foregoing amounts to about any other of the foregoing amounts.

Examples of the rubbery polymer suitable for preparing the graft copolymer resin may include without limitation diene rubbers such as butadiene rubber, styrene-butadiene copolymer, acrylonitrile-butadiene copolymer, and the like; saturated rubbers in which hydrogen is added to a diene rubber; isoprene rubbers; acrylic rubbers such as butyl acrylate and the like; and ethylene/propylene/diene terpolymers (EPDM), and the like, and combinations thereof.

Examples of the aromatic vinyl monomer that can be graft-copolymerized onto the rubber may include without limitation styrene, α-methylstyrene, β-methylstyrene, ρ-methylstyrene, ρ-t-methylstyrene, ethyl styrene, vinyl xylene, monochlorostyrene, dichlorostyrene, dibromostyrene, vinyl naphthalene, and the like. These can be used singly or as a combination of at least two or more thereof.

Examples of the monomer copolymerizable with the aromatic vinyl monomer may include without limitation unsaturated nitrile compounds such as acrylonitrile, ethacrylonitrile, methacrylonitrile, and the like. These can be used singly or as a combination of at least two or more thereof.

Examples of the monomer providing processability and heat resistance may include without limitation acrylic acid, methacrylic acid, maleic acid anhydride, N-substituted maleimide and the like, and combinations thereof.

In an exemplary embodiment of the invention, the rubber modified aromatic vinyl graft copolymer resin (A) can be prepared through two steps. (1) The first step includes preparing a mixture of about 50 to about 70 parts by weight of rubbery polymer latex having an average diameter of about 0.28 to about 0.35 μm and including a gel content of about 75 to about 85% by weight; and about 10 to about 40% by weight of about 30 to about 50 parts by weight of a graft monomer mixture including about 65 to about 85% by weight of styrene and about 15 to about 35% by weight of acrylonitrile; injecting the mixture into a reactor with a molecular weight modifier, a reducing agent, deionized water, an emulsifying agent, and an initiator; and stirring the mixture while increasing the temperature to prepare a first graft copolymer latex until reaching a polymerization conversion ratio of about 90 to about 96%.

(2) The second step includes mixing the remaining amount of the graft monomer mixture from Step 1 (about 60 to about 90% by weight) and a molecular weight modifier with the first graft copolymer latex to form a second mixture. Thereafter, a second graft copolymer latex can be obtained by injecting the second mixture successively into the reactor with an initiator for about 2 to about 5 hours. An exemplary preparation method is disclosed in KR. Pat. Publication No. 2003-56087, which is incorporated herein by reference in its entirety.

The thermoplastic resin composition of the invention may include the rubber modified aromatic vinyl graft copolymer resin (A) in an amount ranging from about 10% to about 20% by weight, based on the total weight of (A), (B), and (C). In some embodiments, the thermoplastic resin composition of the invention can include the rubber modified aromatic vinyl graft copolymer resin (A) in an amount of about 10, 11, 12, 13, 14, 15, 16, 17, 18, 19, or 20% by weight. Further, according to some embodiments of the present invention, the amount of the rubber modified aromatic vinyl graft copolymer resin (A) can be in a range from about any of the foregoing amounts to about any other of the foregoing amounts.

(B) Polymethylmethacrylate (PMMA) Resin

The polymethylmethacrylate resin (B) is prepared by polymerizing methylmethacrylate (MMA) to form an acrylic resin. The polymethylmethacrylate resin (B) may be prepared using methods known in the art and may be easily performed by those of ordinary skill in the art. In exemplary embodiments, the PMMA resin (B) used in accordance with the invention consists of methyl methacrylate monomer (that is, the PMMA includes 100% methyl methacrylate monomer and other monomers are not included in the PMMA resin). In other exemplary embodiments, the PMMA resin (B) used in accordance with the invention can include methyl methacrylate monomer as a majority component (for example, at least about 50% by weight methyl methacrylate monomer, as another example at least about 70% by weight methyl methacrylate monomer, and as yet another example at least about 85% by weight methyl methacrylate monomer) and at least one other monomer polymerizable therewith, such as methacrylic acid.

The polymethylmethacrylate resin (B) of the present invention can impart a good scratch resistance, as represented by pencil hardness.

The thermoplastic resin composition of the invention may include the polymethylmethacrylate resin (B) in an amount ranging from about 30 to about 50% by weight, based on the total weight of (A), (B), and (C). In some embodiments, the thermoplastic resin composition of the invention can include the polymethylmethacrylate (PMMA) resin (B) in an amount of about 30, 31, 32, 33, 34, 35, 36, 37, 38, 39, 40, 41, 42, 43, 44, 45, 46, 47, 48, 49, or 50% by weight. Further, according to some embodiments of the present invention, the amount of the polymethylmethacrylate (PMMA) resin (B) can be in a range from about any of the foregoing amounts to about any other of the foregoing amounts.

If amount of the polymethylmethacrylate resin (B) is more than about 50% by weight, the impact strength can be deteriorated. If amount of the polymethylmethacrylate resin (B) is less than about 30% by weight, the composition may not have good scratch resistance.

In exemplary embodiments of the present invention, the polymethylmethacrylate resin (B) can be prepared by mixing deionized water, a cross-linking agent, an emulsifying agent, an initiator, a methyl methacrylate monomer, and methacrylic acid while increasing the temperature, and thereafter, polymerizing the mixture by adding a catalyst compound.

(C) Aromatic Vinyl Copolymer Resin Including about 5 to about 50% by Weight of a (Meth)Acrylate Alkyl Ester The aromatic vinyl copolymer resin (C) including about 5 to about 50% by weight of the (meth)acrylate alkyl ester is prepared by copolymerizing a (meth)acrylic acid alkyl ester, an aromatic vinyl compound, and an unsaturated nitrile compound.

In exemplary embodiments, the aromatic vinyl copolymer resin (C) may include about 5 to about 50% by weight, for example about 10 to about 30% by weight, and as another example about 15 to about 20% by weight, of the (meth) acrylate alkyl ester, about 30 to about 80% by weight of the aromatic vinyl compound, and about 10 to about 40% by weight of an unsaturated nitrile compound.

In some embodiments, the (meth)acrylate alkyl ester may be used in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the (meth) acrylate alkyl ester can be in a range from about any of the foregoing amounts to about any other of the foregoing amounts.

In some embodiments, the aromatic vinyl compound may be used in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the aromatic vinyl compound can be in a range from about any of the foregoing amounts to about any other of the foregoing amounts.

In some embodiments, the unsaturated nitrile compound may be used in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of the unsaturated nitrile compound can be in a range from about any of the foregoing amounts to about any other of the foregoing amounts.

The (meth)acrylic acid alkyl ester can include a $C_1$ to $C_8$ alkyl. The (meth)acrylic acid alkyl esters are alkyl esters of methacrylic acid or acrylic acid, respectively. For example, $C_1$ to $C_8$ alkyl esters may be obtained from $C_1$ to $C_8$ monohydroxy alcohols. Examples of methacrylic acid alkyl esters and acrylic acid alkyl esters useful in the invention include without limitation methacrylic acid methyl ester, methacrylic acid ethyl ester, acrylic acid ethyl ester, acrylic acid methyl ester, methacrylic acid propyl ester, and the like, and combinations thereof.

Examples of the aromatic vinyl compound may include without limitation styrene, α-methylstyrene, β-methylstyrene, ρ-methylstyrene, ρ-t-methylstyrene, ethyl styrene, vinyl xylene, monochlorostyrene, dichlorostyrene, dibromostyrene, vinyl naphthalene, and the like. These can be used singly or as a combination of at least two or more thereof.

Examples of the unsaturated nitrile compounds may include without limitation acrylonitrile, methacrylonitrile, ethacrylonitrile, and the like. These can be used singly or a combination of at least two or more thereof.

The aromatic vinyl copolymer resin (C) can be a transparent resin and can have a weight average molecular weight of about 100,000 to about 200,000, for example, about 120,000 to about 160,000.

The thermoplastic resin composition of the invention may include the aromatic vinyl copolymer resin including about 5 to about 50% by weight of (meth)acrylate alkyl ester (C) in an amount ranging from about 40% to about 60% by weight, based on the total weight of (A), (B), and (C). In some embodiments, the thermoplastic resin composition of the invention can include the aromatic vinyl copolymer resin including about 5 to about 50% by weight of (meth)acrylate alkyl ester (C) in an amount of about 40, 41, 42, 43, 44, 45, 46, 47, 48, 49, 50, 51, 52, 53, 54, 55, 56, 57, 58, 59, or 60% by weight. Further, according to some embodiments of the present invention, the amount of the aromatic vinyl copolymer resin including about 5 to about 50% by weight of (meth) acrylate alkyl ester (C) can be in a range from about any of the foregoing amounts to about any other of the foregoing amounts.

The thermoplastic resin composition according to the present invention may further include one or more other components such as but not limited to antioxidants, lubricants, impact modifiers, plasticizers, stabilizers, light stabilizers, pigments, dyes, inorganic fillers, antibacterial agents, antistatic agents, and the like and combinations thereof depending on the desired properties to be imparted to the final thermoplastic resin composition. Exemplary antioxidants may include without limitation hindered phenolic antioxidants, phosphoric acid ester antioxidants, and the like, and combinations thereof. Exemplary lubricants may include without limitation stearamide lubricants, metal stearate lubricants, and the like, and combinations thereof. The additives(s) can be used in conventional amounts.

The thermoplastic resin composition according to the present invention can have excellent injection molding properties and Izod impact strength as compared with prior scratch resistance resins. Further, as a scratch resistance resin, the thermoplastic resin composition of the present invention can exhibit a good balance of properties such as dyeability, high gloss, and scratch resistance, among others, without requiring a post processing step such as a UV coating process, acrylic resin film adhesion process and the like.

The thermoplastic resin composition according to the present invention can be prepared using conventional methods. For example, the components of the composition and optional additives can be mixed together and extruded through an extruder. The composition can be prepared in the form of pellets or chips or alternatively can be directly molded into the desired product.

The resin composition of the present invention can be used in the production of various products including without limitation housings for electric and electronic goods such as TVs, audio devices, cellular phones, digital cameras, navigation systems, washing machines, computers, monitors, MP3 players, video players, CD players, and the like. Methods for preparing the plastic molded articles using the resin compositions of the present invention are not limited and can include as non-limiting examples extrusion, injection molding or casting. Such methods are known in the art and be readily conducted by those skilled in the art.

The present invention will be well understood by the following examples. The following examples of the present invention are only for illustrative purposes and are not construed as being limited to the scope of the present invention defined by the appended claims.

EXAMPLES

The base resins used in Examples and Comparative Examples are prepared as follows.

(A) Core-Shell Rubber Modified Aromatic Vinyl Graft Copolymer Resin

The core-shell rubber modified aromatic vinyl graft copolymer resin (A) of the examples and comparative examples of the present invention is a core-shell g-ABS copolymer resin having an average particle diameter of 300 μm which is prepared by emulsion graft polymerization of 58 parts by weight of polybutadiene rubber latex, 36 parts by weight of acrylonitrile, and 65 parts by weight of styrene.

(B) Polymethylmethacrylate (PMMA) Resin

A polymethylmethacrylate (PMMA) resin having a weight-average molecular weight of 85,000 and including 88 parts by weight of methyl methacrylate monomer and 12 parts by weight of methacrylic acid is used.

(C) Aromatic Vinyl Copolymer Resin Including a (Meth) Acrylate Alkyl Ester

A M-SAN resin having a weight-average molecular weight of 80,000 and including 20 parts by weight of methyl methacrylate monomer, 20 parts by weight of acrylonitrile monomer, and 70 parts by weight of styrene monomer is used.

(D) Methyl Methacrylate-Styrene (MS) Resin (d1) MS-300 including 30% by weight methyl methacrylate styrene resin produced by NIPPON STEEL CORPORATION is used.

(d2) MS-320XL including 20% by weight methyl methacrylate styrene resin produced by NIPPON STEEL CORPORATION is used.

Example 1

About 11% by weight of g-ABS, about 35% by weight of PMMA and about 54% by weight of MSAN are mixed to prepare a mixture. The mixture further include about 0.3 parts by weight of an antioxidant (Irganox 1076 (Ciba)), about 0.4 parts by weight of a lubricant (ethylene bis-stearamide antioxidant), about 0.3 parts by weight of a stabilizer (magnesium stearate) and about 0.3 parts by weight of a carbon black. The mixture is fed into a conventional twin screw extruder and extruded as pellets. Thereafter the specimen for measuring the colorability is produced by an injection machine.

Examples 2-4 and Comparative Examples 1-3

Examples 2-4 and Comparative Examples 1-3 are prepared in the same manner as in Example 1 except that the amounts of the components as shown in Table 1 are used.

TABLE 1

|  |  | Examples | | | | Comparative Examples | | |
|---|---|---|---|---|---|---|---|---|
|  |  | 1 | 2 | 3 | 4 | 1 | 2 | 3 |
| (A) g-ABS |  | 11 | 13 | 15 | 17 | — | 15 | 22 |
| (B) PMMA |  | 35 | 37 | 35 | 43 | 100 | — | — |
| (C) M-SAN |  | 54 | 50 | 50 | 40 | — | — | — |
| (D) MS | (d1) | — | — | — | — | — | 85 | — |
|  | (d2) | — | — | — | — | — | — | 78 |

(unit: wt %)

The physical properties of test specimens obtained in the above Examples and Comparative Examples are measured as follows and the results are shown in Table 2:

(1) Izod impact strength (kgf·cm/cm) is measured in accordance with ASTM D256 under a ⅛" notched condition.

(2) Flow index (g/10 min) is measured in accordance with ISO1103, under a condition of about 220° C./10 kg.

(3) R-Hardness: The Rockwell Hardness is measured in accordance with ASTM D785.

(4) Flexural modulus and Tensile strength: The flexural modulus is measured in accordance with ASTM D790 (kgf/cm$^2$), and the tensile strength is measured in accordance with ASTM D638 (kgf/cm$^2$).

(5) Pencil Hardness: The pencil hardness is measured by applying 500 g load 5 times to a surface of a test sample having a size of 3 mm (thickness)×10 mm (length)×6 mm (width) according to JIS (Japanese Industry Standard) K5401 at 23° C. The surface of the sample is visually checked for scratches. If two or more scratches are observed, the test is repeated with a pencil of one grade lower hardness. The results are reported on a scale of 4B to 7H.

(6) Colorability: The values of ΔL and Δb are measured by means of a spectrophotometer. The standard is the ABS resin obtained from Comparative Example 4. If ΔL is negative, this means that the sample is lighter than the standard. Δb defines the difference as a blue/yellow value. If Δb is negative, the sample is more blue, which means good colorability.

(7) Gloss is measured in accordance with ASTM D523.

TABLE 2

|  | Examples | | | | Comparative Examples | | |
|---|---|---|---|---|---|---|---|
|  | 1 | 2 | 3 | 4 | 1 | 2 | 3 |
| Izod impact strength (⅛") | 7.3 | 11.8 | 12.8 | 15.8 | 1.5 | 7.3 | 8.2 |
| MI(220° C., 3.8 Kg) | 14.0 | 11.7 | 9.2 | 7.3 | 3.9 | 16.3 | 18.7 |
| R-Hardness | 117 | 115 | 115 | 116 | 122 | 112 | 111 |
| Tensile strength | 550 | 520 | 510 | 510 | 760 | 500 | 490 |
| Flexural modulus | 27,600 | 26,100 | 25,600 | 25,400 | 31,000 | 22,900 | 23,000 |
| Pencil Hardness | H | H | H | H | 4H | F | HB |
| Injection stability | ◎ | ◎ | ◎ | ◎ | x | Δ | Δ |
| Gloss | 85 ↑ | 85 ↑ | 85 ↑ | 85 ↑ | 85 ↑ | 80 ↑ | 70 ↑ |
| Colorability (Δ L) | 0.1 | 0.1 | 0.2 | 0.0 | −1.2 | 1.7 | 2.0 |

As shown in Table 2, Comparative Example 1 using only PMMA resin shows poor impact resistance and injection moldability, although it has good scratch properties such as pencil hardness and R-hardness, gloss, colorability. Comparative Examples 2 and 3 which do not include PMMA but include a MS resin with methylmethacrylate in an amount of less than 40% exhibit insufficient R-hardness and pencil hardness, and colorability. Further, the colorability deteriorated.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition that can have improved scratch resistance comprising:
   (A) about 10 to about 20% by weight of a rubber modified aromatic vinyl graft copolymer resin;
   (B) about 30 to about 50% by weight of polymethylmethacrylate (PMMA) resin; and
   (C) about 40 to about 60% by weight of an aromatic vinyl copolymer resin including about 5 to about 50% by weight of a (meth)acrylate alkyl ester.

2. The thermoplastic resin composition of claim 1, wherein said rubber modified aromatic vinyl graft copolymer resin comprises about 10 to about 60% by weight of a rubbery polymer, about 20 to about 80% by weight of an aromatic vinyl monomer, and about 5 to about 45% by weight of a monomer copolymerizable with the aromatic vinyl monomer.

3. The thermoplastic resin composition of claim 2, wherein said rubbery polymer comprises a diene rubber, saturated rubber in which hydrogen is added to a diene rubber, isoprene rubber, chloroprene rubber, acrylic rubber, ethylene/propylene/diene terpolymer (EPDM), or a combination thereof.

4. The thermoplastic resin composition of claim 2, wherein said aromatic vinyl monomer comprises styrene, α-methylstyrene, β-methylstyrene, ρ-methylstyrene, ρ-t-methylstyrene, ethyl styrene, vinyl xylene, monochlorostyrene, dichlorostyrene, dibromostyrene, vinyl naphthalene, or a combination thereof.

5. The thermoplastic resin composition of claim 2, wherein said monomer copolymerizable with the aromatic vinyl monomer comprises acrylonitrile, methacrylonitrile, ethacrylonitrile, or a combination thereof.

6. The thermoplastic resin composition of claim 1, wherein said aromatic vinyl copolymer resin (C) comprises about 5 to about 50% by weight of the (meth)acrylic acid alkyl ester, about 30 to about 80% by weight of an aromatic vinyl compound, and about 10 to about 40% by weight of an unsaturated nitrile compound.

7. The thermoplastic resin composition of claim 1, wherein said aromatic vinyl copolymer resin (C) includes about 10 to about 30% by weight of the (meth)acrylate alkyl ester.

8. The thermoplastic resin composition of claim 1, further comprising one or more additives selected from the group consisting of antioxidants, lubricants, impact modifiers, plasticizers, stabilizers, light stabilizers, pigments, dyes, inorganic fillers, antibacterial agents, antistatic agents and combinations thereof.

9. A molded article prepared from the thermoplastic resin composition of claim 1.

* * * * *